Feb. 22, 1966 M. MÜLLER 3,237,121

SYSTEM FOR ELIMINATING AM TO PM CONVERSION IN AN FM SYSTEM UTILIZING A PLURALITY OF EQUALIZERS

Filed Feb. 6, 1963

INVENTOR.
M. MULLER
BY
Pauls Hemminger
Attorney 3,237,121
Patented Feb. 22, 1966

3,237,121

SYSTEM FOR ELIMINATING AM TO PM CONVERSION IN AN FM SYSTEM UTILIZING A PLURALITY OF EQUALIZERS

Martin Müller, Pforzheim, Germany, assignor to International Standard Electric Corporation, New York, N.Y., a corporation of Delaware Filed Feb. 6, 1962, Ser. No. 256,670
Claims priority, application Germany, Feb. 10, 1962, St 18,842
1 Claim. (Cl. 330—207)

The invention relates to amplifiers for frequency-modulated signals having bandwidths which are large compared to the frequency deviation. This invention is suitable for use in relay amplifiers of radio link systems, and is particularly advantageous when used in the transmit end of such amplifiers where traveling wave tubes are frequently used as transmitting tubes.

It is known that traveling wave tubes must be operated as extensively as possible in the linear portion of their characteristics in order to obtain a low-distortion transmission. This is necessary since it is one of the properties of traveling wave tubes that they convert amplitude modulation into frequency modulation when transmitting under large signal conditions. The exact nature of the process by which this conversion occurs does not appear to be known. This is indicated by the measuring unit °/db which is used to indicate the convertibility (conversion transconductance) from AM to FM. In this measuring unit a phase angle representing a relative voltage is related to the logarithm of a relative power, between which no proportionality exists as investigations have revealed. Empirical values for this convertibility at the saturation point of traveling wave tubes range from 4 to 7°/db units.

As a rule, in known systems, the transmitting traveling wave tubes are operated at half their saturation power, and thus the convertibility is about half the °/db units. According to investigations on which the invention is based, it is more significant to speak of an AM to PM conversion, which is a conversion to phase modulation. Then the 7°/db as customarily used is equal to the ratio of 1:1, or to a 0 db-conversion, whereas the practical values from 2 to 3.5°/db for traveling wave power tubes (semi-saturation) are identical to a —6 to —11 db-conversion.

The known measures for reducing the distortion in transmit-traveling wave-tubes by operating them below their saturation power are extremely expensive. They not only necessitate the use of a larger and consequently more expensive tube than would be necessary to produce the desired output power, but moreover the tube must be operated at considerably reduced efficiency which burdens the power supply as well as the heat dissipation capacity and consequently increases the operational costs. The conversion reduction, obtainable in this way which is in the order of approximately 10 db, is insufficient in many cases. To prevent any distortion caused by the conversion, the convertibility should not be larger than $1:10/z$, as investigations have revealed, with $z$ indicating the phase deviation of the transmission system. This requirement amounts to —30 db for an 1800-channel system.

It has been proposed to apply limiting means to the input of the traveling wave tubes whereby the conversion could be reduced by the limiting coefficient. Since, however, a useful limiter for the frequency ranges in question is hitherto unknown, the mixer preceding the traveling wave tube was fed through a sideband filter at such a working point that an amplitude limiting action occurred. The success of this measure, however, was much smaller than expected.

The object of the invention is to overcome these disadvantages and difficulties. In carrying out this object it is necessary to recognize that the danger of AM to PM conversion not only resides in traveling wave tubes near the saturation point, but generally in elements of non-linear amplitude characteristics which are included in the FM-transmission path. These non-linear elements include the intermediate frequency amplifier tubes and mixers operating at large signals, provided that the mixers are operated with an FM-signal of comparable amplitude to that of the oscillator. This may partly account for the inefficiency of the aforementioned known limiter-mixer.

According to the present invention a limiter is provided preceding the amplitude non-linear element which may cause the danger of a conversion, with this limiter being employed at such a level that its generally inherent conversion can be easily kept small. The invention further outlines how the transmission elements between this sufficiently ideal limiter and the members capable of performing a conversion can be kept free from amplitude modulation.

This technical rule is gained from the knowledge that from an FM-signal, particularly of small phase deviation (radio-link-FM) in linear circuit elements, an amplitude modulation occurs if, in the frequency range covered by the signal, the group-delay-time curve $T(\Omega)$ or/and the attenuation curve a $(\Omega)$ deviates from constants. This is particularly the case at deviations with an even order function of $\Omega$ around the carrier $\Omega_0$, because they produce an amplitude modulation of second order, the conversion of which leads to a genuine FM-distortion coefficient of second order. This AM, as soon as modulated into the FM-signal, already is of non-negligible magnitude when the pure FM-non-linear distortion factor of third order of said characteristic can still be neglected. On the other hand this AM can also be avoided, if the characteristics $T(\Omega)$ and a $(\Omega)$ are sufficiently levelled-out in the way known per se, but at the correct point of the signal path.

By use of the method in accordance with the invention it is proposed in an FM-transmission system to prevent undesired AM-to-PM conversion. This is accomplished by equalizing the transmission or by compensating the amplitude modulation occurring at linear elements having certain delay time and amplitude attenuations, by the use of well-known equalizers before the signals are passed to the next amplitude non-linear element.

The invention will now be explained in greater detail with the aid of the accompanying drawings comprising FIGS. 1 to 3 in which.

Figures 1, 2, 3:
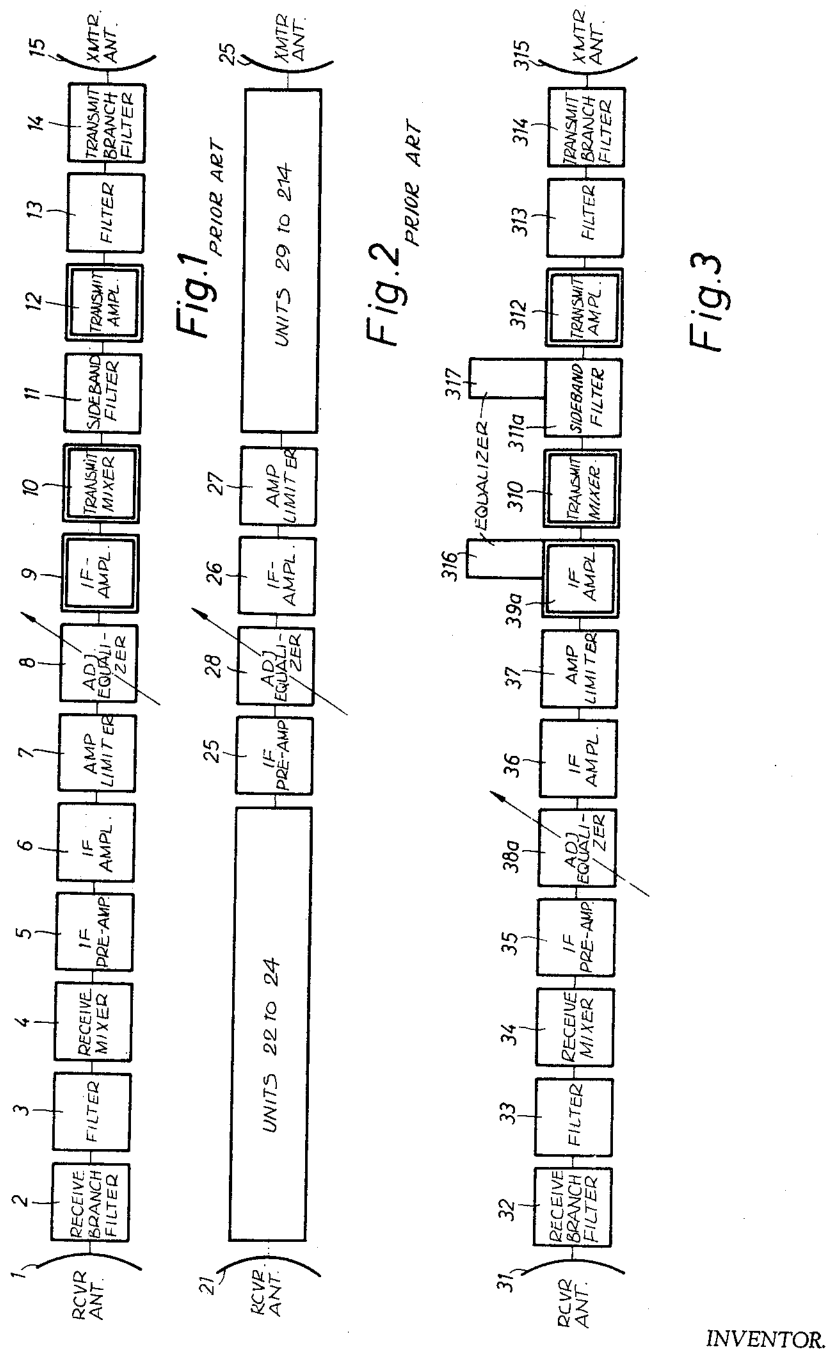
Fig.1 PRIOR ART, Fig.2 PRIOR ART, Fig.3
FIG. 1 shows a block diagram of the relay station of a radio link in a known frequency modulated transmission system.
FIG. 2 shows a block diagram of another known relay station which is a variation of the system of FIG. 1.
FIG. 3 shows a block diagram of the relay station of a radio link of a frequency modulation system according to the invention.

In FIG. 1 a receive antenna 1 is connected in sequence to a receive branch filter 2, a receive filter 3, a mixer 4 and its oscillator supply, an IF-preamplifier 5, an IF main amplifier 6, an amplitude limiter 7, an adjustable equalizer 8, an IF transmit amplifier 9, a transmit mixer 10 and its oscillator, a sideband filter 11, a transmit amplifier (traveling wave tube) 12, a filter 13, a transmit branch filter 14 and a transmit antenna 15.

In FIG. 2, the arrangement includes units 21–29 and 210–214 corresponding to units 1–14 in FIG. 1 and differs in arrangement from that shown in FIG. 1 in that an equalizer 28 is arranged between the IF preamplifier 25 and the IF main amplifier 26. The single-line rectangles in both FIGS. 1 and 2 represent amplitude-linear units, while the double-line rectangles represent amplitude-non-linear transmission units in which amplitude modulation may be converted partly into FM-distortion. Both circuit arrangements must produce a convertible AM, even at an optimum layout of the equalizer 8 or 28.

In FIG. 3, the components corresponding to similar ones in FIG. 1 are marked with the same reference numerals preceded by the digit 3. An equalizer 38*a* of customary type is connected to the following transmission components in series: Antenna 31, branch filter 32, filter 33, mixer 34, and IF preamplifier 35. Equalizer 38*a* is dimensioned to equalize the non-linearities having occurred in the preceding linear transmission components. A limiter 37 follows the IF main amplifier 36 which practically represents the last possibility with regard to frequency and level to apply amplitude limiting free from conversion within the signal path.

The following IF amplifier 39*a* consists of large signal tube amplifiers representing amplitude-non-linear elements capable of performing AM-to-PM-conversion. Between these tube amplifiers and practically also in front of the mixer 310, at which primarily there exists the danger of an AM-to-PM-conversion, IF-filters are inserted which, as aforementioned, give rise to amplitude modulation. In order to avoid FM-distortion at the involved amplitude-non-linear characteristics, the attenuation and time-delay curve of each individual filter must be flattened. This is accomplished by an equalizing transmission member or amplitude flattening member 316, labeled "equalizer" in FIG. 3, which is level-balanced in itself. A suitable equalizer may be provided in accordance with design considerations set out in pages 17–4 through 17–18 in "Electronic Designers Handbook" by Landee, Davis and Albrecht, published by McGraw-Hill Book Company, 1957. The sideband filter 311*a* is likewise equalized with respect to attenuation and group delay, but since it does not comprise any amplitude non-linear elements it is sufficient, when using an amplitude flat filter, to perform a single equalization by adding a conventional all-pass section 317 for flattening the group delay time characteristic. Both the transmit mixer 310 and the traveling wave tube amplifier 312 correspond to the components as used in the arrangement of FIGS. 1 and 2.

According to the progress attainable by the invention, the traveling wave tube can be operated by any large signal up to saturation, because it receives a signal free from amplitude modulation. The equalization in the IF amplifier 39*a* can be achieved by the well-known IF means, whereas for equalizing the sideband filter there will have to be employed means of the transmission line technique.

In cases where lower demands are placed on the requirement for freedom from distortion of the transmission system, a rough equalization is frequently sufficient in the case of the additional members 316 and 317 of FIG. 3 with respect to approximately flattening the even-order components of the transmission characteristics between the limiter and the amplitude non-linear elements. Such a rough equalization may be technically realized in an essentially simpler way in the case of the equalizer 38*a*, where precision adjustability can be avoided.

While the principles of the invention have been described in connection with specific apparatus, it is to be clearly understood that this description is made only by way of example and not as a limitation on the scope of the invention.

I claim:

In a system for eliminating distortion caused by amplitude modulation to phase modulation conversion in frequency modulated carrier transmission systems having a small modulation index, said system comprising:

a plurality of elements coupled in series in a signal path, said plurality of elements including amplitude linear elements and amplitude non-linear elements, said amplitude linear elements producing signals having certain variations in delay time and amplitude level with shift of the frequency of the carrier, said amplitude non-linear elements receiving said signals and producing amplitude to phase modulation conversion due to the said certain variations in said signals, the improvement comprising:

a plurality of equalizers individually capable of adjusting said signals to compensate for the said certain variations of corresponding ones of each of the foregoing plurality of linear elements, and means for coupling each of said equalizers to a corresponding one of the plurality of elements to minimize the said certain variations in delay time and amplitude level and thereby prevent amplitude to phase modulation conversion.

References Cited by the Examiner

UNITED STATES PATENTS 2,276,008 3/1942 Armstrong ---------- 325—11

HERMAN KARL SAALBACH, *Primary Examiner.*

ALFRED L. BRODY, *Examiner.*

P. L. GENSLER, *Assistant Examiner.*